US010721225B1

United States Patent
Baszucki et al.

(10) Patent No.: US 10,721,225 B1
(45) Date of Patent: Jul. 21, 2020

(54) CRYPTO EXCHANGE FRIENDING

(71) Applicant: Roblox Corporation, San Mateo, CA (US)

(72) Inventors: David B. Baszucki, Portola Valley, CA (US); Deepak Murali Chandrasekaran, Belmont, CA (US)

(73) Assignee: Roblox Corporation, San Mateo, CA (US)

( * ) Notice: Subject to any disclaimer, the term of this patent is extended or adjusted under 35 U.S.C. 154(b) by 369 days.

(21) Appl. No.: 15/649,404

(22) Filed: Jul. 13, 2017

(51) Int. Cl.
| | |
|---|---|
| *G06F 12/06* | (2006.01) |
| *H04L 29/06* | (2006.01) |
| *H04W 4/21* | (2018.01) |
| *H04W 12/06* | (2009.01) |
| *H04L 12/58* | (2006.01) |
| *A63F 13/79* | (2014.01) |
| *A63F 13/87* | (2014.01) |
| *A63F 13/75* | (2014.01) |

(52) U.S. Cl.
CPC ............ *H04L 63/083* (2013.01); *A63F 13/75* (2014.09); *A63F 13/79* (2014.09); *A63F 13/87* (2014.09); *H04L 51/046* (2013.01); *H04L 51/10* (2013.01); *H04L 67/38* (2013.01)

(58) Field of Classification Search
CPC ......... G06F 21/64; H04W 4/21; H04W 12/06; H04L 29/06; H04L 51/04; H04L 63/10; H04L 67/20; H04L 67/22; H04L 67/38
See application file for complete search history.

(56) References Cited

U.S. PATENT DOCUMENTS

| | | | |
|---|---|---|---|
| 2008/0167129 A1* | 7/2008 | Aaron | A63F 13/10 463/42 |
| 2014/0164635 A1* | 6/2014 | Lin | H04L 65/1069 709/229 |
| 2015/0188915 A1* | 7/2015 | Li | H04L 63/126 705/44 |
| 2015/0244725 A1* | 8/2015 | Ziskind | H04L 63/101 726/28 |

\* cited by examiner

*Primary Examiner* — Alexander Lagor
*Assistant Examiner* — Kalish K Bell
(74) *Attorney, Agent, or Firm* — Lowenstein Sandler LLP (57) ABSTRACT

A system and method includes establishing a trusted relationship between a first user using a first user device to access a collaboration platform and a second user using a second user device to access the collaboration platform. The method includes receiving, by the collaboration platform, a request from the first user device to establish the trusted relationship with the second user of the collaboration platform. The method also includes transmitting a first authentication code to the first user device responsive to the request. The method includes receiving a second authentication code from the second user device. The method further includes authenticating the second user to establish the trusted relationship between the first user and the second user of the collaboration platform responsive to determining the second authentication code received from the second user device matches the first authentication code transmitted to the first user device.

20 Claims, 5 Drawing Sheets

CRYPTO EXCHANGE FRIENDING

TECHNICAL FIELD

This disclosure relates to the field of collaboration platforms and, in particular, establishing a trusted relationship between users of a collaboration platform.

BACKGROUND

Collaboration platforms allow users to connect to and share information with each other via the Internet. Collaboration platforms may include a gaming platform, a social networking platform, a purchasing platform, a messaging platform, a creation platform, among others. Users of a collaboration platform, such as a gaming platform, may participate in multi-user gaming environments, design custom gaming environments, decorate avatars, or exchange virtual items with other users, and so forth.

DESCRIPTION OF DRAWINGS

Various implementations of the present disclosure will be understood more fully from the detailed description given below and from the accompanying drawings of various implementations of the disclosure.

DETAILED DESCRIPTION

Collaboration platforms (e.g., gaming platforms, communication platforms, social networking platforms, purchasing platforms, etc.), offer a variety of ways for users to interact with one another. For example, users of a collaboration platform may work together towards a common goal (e.g., online games), share or exchange various items (e.g., currency, virtual currency, virtual items, etc.), send electronic messages to one another, and so forth. Some interactions through a collaboration platform may be sensitive. In some implementations, an interaction may be sensitive due to the nature of the interaction (e.g., a purchase, transmitting sensitive information, etc.). In some implementations, an interaction may be sensitive due to one or more of the users participating in the interaction. For example, a user may be minor (e.g., the user is less than 13 years old) and may benefit from special protections on the sharing of information with and by the minor. Allowing all users to participate in certain interactions (e.g., sensitive interactions) with other users may expose users to abusive interactions such as abusive messages, mistreatment of a minors, fraudulent statements, misrepresentation (e.g., identity theft, impersonation of a minor), inducing of transfer of items, for example. Not allowing any users to participate in certain interactions may discourage users from using the collaboration platform to interact with each other. Determining which users may participate in certain interactions with each other may present challenges, in particular for minors who may be vulnerable to predatory users.

Aspects of the present disclosure address the above-mentioned and other challenges by establishing a trusted relationship between users of a collaboration platform who have an ability to communicate with each other outside of the collaboration platform. For example, the users may be physically proximate one another or may be able to communicate via telephone, email, etc. An ability for users to communicate with each other outside of the collaboration platform may be an indicator or imply that the users are more likely to be trustworthy (e.g., the users are real-life friends). In some implementations, users that establish a trusted relationship via the collaboration platform may have access to additional functionalities (e.g., additional interactions) that may not be available to users that have not established a trusted relationship.

In one implementation, a collaboration platform receives a request from a first user device to establish the trusted relationship with a second user of the collaboration platform. Responsive to the request, the collaboration platform transmits a first authentication code to the first user device. Responsive to the first user communicating the first authentication code to the second user outside of the collaboration platform, the collaboration platform receives a second authentication code from the second user device. Responsive to the collaboration platform determining the second authentication code received from the second user device matches the first authentication code transmitted to the first user device, the collaboration platform authenticates the second user to establish the trusted relationship between the first user and the second user of the collaboration platform.

Establishing trusted relationships on a collaboration platform between users that have an ability to communicate outside of the collaboration platform (e.g., know each other both inside and outside of the collaboration platform) as disclosed herein is advantageous because it provides a safer and more trustworthy way to allow interactions between users and helps create a safer environment for users of the collaboration platform. The technology may place lower restrictions on interactions between users with an established trusted relationship in the collaboration platform and higher restrictions on interactions between users without an established trusted relationship in the collaboration platform. This improves overall user experience via the collaboration platform, and increases the content consumed (e.g., time using the collaboration platform) by users of the collaboration platform. In addition, aspects of the present disclosure result in significant reduction of storage resources and significant reduction of computational (processing) resources because establishing trusted relationships among users that know each other inside and outside of the collaboration network is more efficient than monitoring for non-trustworthy relationships between users or performing remedial measures to remedy actions created by users with non-trustworthy relationships, for example.

It may be noted that a collaboration platform described as a gaming platform herein is provided for purposes of illustration, rather than limitation. A collaboration platform may be one or more of numerous platforms, such as a gaming platform, communication platform, social networking platform, purchasing platform, and so forth.

Figure 1:
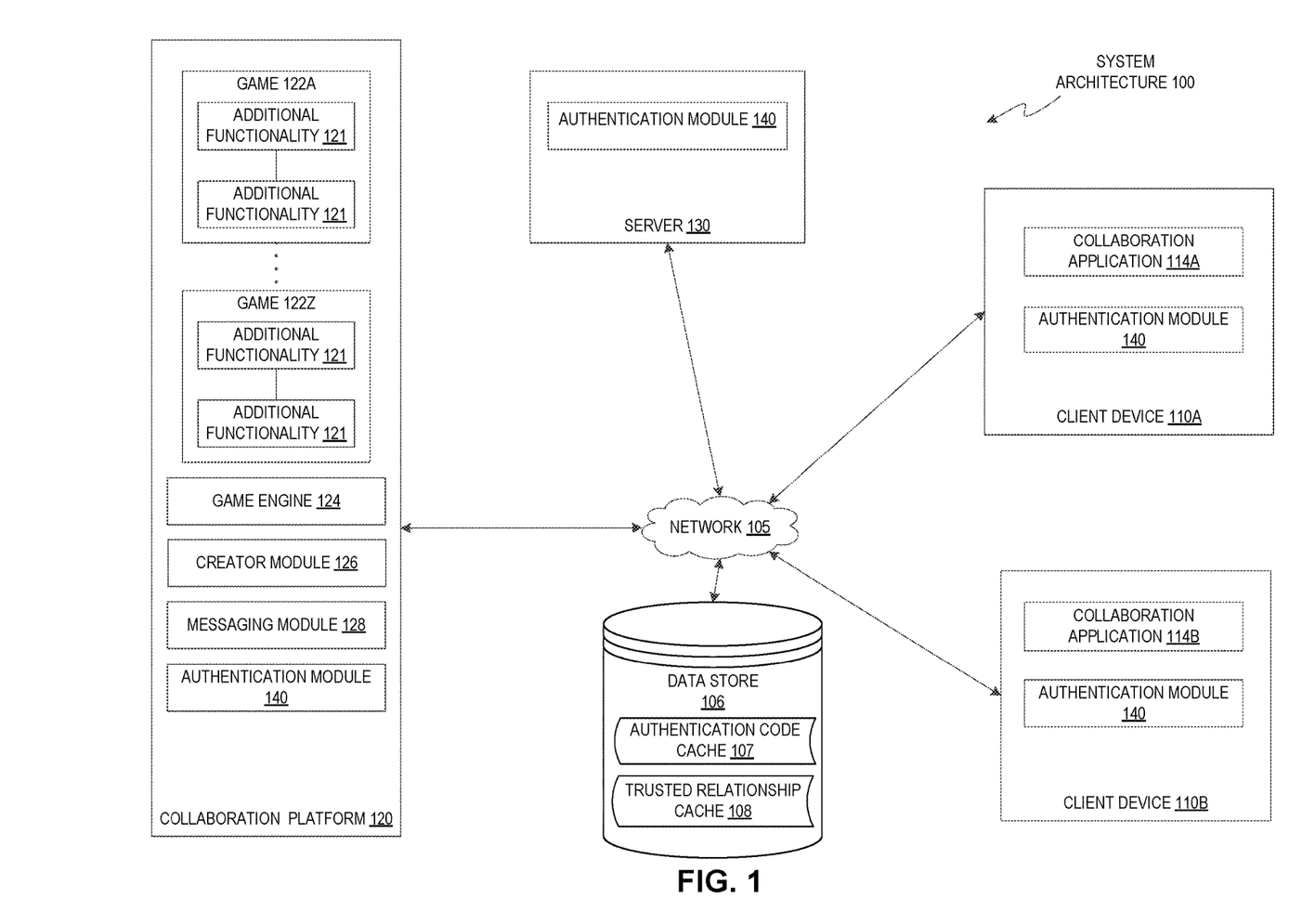
FIG. 1 illustrates an example system architecture, in accordance with some implementations.

FIG. 1 illustrates an example system architecture 100, in accordance with one implementation of the disclosure. The system architecture 100 includes client devices 110A and 110B, a network 105, a data store 106, a collaboration platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 may include an authentication code cache 107 and a trusted relationship cache 108.

In implementations, the server 130 may be one or more computing devices (e.g., a rackmount server, a server computer, etc.). The server 130 may be included in the collaboration platform 120, be an independent system or be part of another system or platform. The server 130 may include authentication module 140.

In one implementation, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to collaboration platform 120. The collaboration platform 120 may also include a website (e.g., a webpage) or application back-end software that may be used to provide a user with access to content provided by collaboration platform 120.

In implementations, collaboration platform 120 may be a type of social network providing connections between users. In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a game 122 or component of a game 122 of the collaboration platform 120.

In one implementation, collaboration platform 120 may be a gaming platform. For example, the gaming platform may provide single-player or multi-player games to a community of users that may access or interact with the games 122A-122Z using client devices 110. Games 122 (also referred to as "video game," "online game," or "virtual game" herein) may be two-dimensional (2D), three-dimensional (3D) games, virtual reality (VR) games, augmented reality (AR) games, for example. A game 122 can include an electronic file that can be executed or loaded using software, firmware or hardware configured to present the digital media item to an entity. In one implementation, collaboration platform 120 hosts games 122 and allows users to interact with the games 122 using collaboration application 114 of client device 110. Users of collaboration platform 120 may play, create, interact with, and build games 122, or create and build content of games 122. For example, users may create characters, decoration for the characters, one or more virtual environments for an interactive game, or build structures in a game, for example. In implementations, users may buy, sell, or trade game items, such as in-platform currency (e.g., virtual currency), with other users of the collaboration platform 120. In implementations, collaboration platform 120 may transmit game content to collaboration applications 114. Game content (also referred to as "content") may refer to any data or software instructions (e.g., in-game items, user information, video, images, commands, etc.) associated with collaboration platform 120 or collaboration applications 114. It may be noted that collaboration platform 120 hosting games 122, is provided for purposes of illustration, rather than limitation. In some implementations, collaboration platform 120 may host one or more media items. Media items can include, but are not limited to, digital video, digital movies, digital photos, digital music, audio content, melodies, website content, social media updates, electronic books (eBooks), electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity.

In one implementation, collaboration platform 120 may consolidate the game content from the client devices 110 and transmit the consolidated game content (e.g., gaming video, rendering commands, user input, graphics library commands, etc.) to each of the client devices 110 to display interactions of the multiple users in a multi-player gaming environment. In another implementation, collaboration platform 120 may transmit the game content from the one or more client devices 110 to another client device for the other client device to consolidate and display the game content. In another implementation, the collaboration platform 120 may receive the game content (e.g., first user transmitting user input via client device 110A and second user transmitting user input via client device 110B), generate a game result (e.g., first user beats second user), and transmit the game results to the client devices 110.

In some implementations, a game 122 may be associated with a particular user or particular group of users (e.g., a private game), or made widely available to users of the collaboration platform 120 (e.g., a public game). In implementations, where collaboration platform 120 associates one or more games 122 with a specific user or group of users, collaboration platform 120 may associate the specific user(s) with a game 122 using user account information (e.g., a user account identifier such as username and password).

In some implementations, a game 122 may include base functionalities and additional functionalities 121. Users of the collaboration platform 120 may participate in the base functionalities of a game 122 without using the additional functionalities of the game 122. In some implementations, the base functionalities are granted to all (or most) users of collaboration platform 120, and the additional functionalities are granted for a smaller set of users, such as the users of a trusted relationship. In some implementations, the additional functionalities 121 may allow sensitive interactions between users (e.g., messaging functionalities, following functionalities, sharing functionalities, purchasing functionalities, inviting functionalities, etc.). In implementations, the additional functionalities 121 may be available to users that have established trusted relationships with each other.

In some implementations, users that have not established a trusted relationship with each other may be prevented from using the additional functionalities 121 to interact with each other. In some implementations, users of the collaboration platform 120 that are under a threshold age (e.g., minors that are users under 13 years old) are prevented from using the additional functionalities 121 to interact with other users with whom a trusted relationship has not been established. In some implementations, users of the collaboration platform 120 that have provided less than a threshold amount of information to the collaboration platform 120 (e.g., guest users, users that have not provided a birth date to the collaboration platform 120, etc.) are prevented from using the additional functionalities 121 to interact with other users with whom a trusted relationship has not been established. In some implementations, users of the collaboration platform 120 that have participated with the collaboration platform 120 for less than a threshold amount of time (e.g., have been registered with the collaboration platform 120 for less than a threshold amount of time (e.g., registered less than one month ago), have logged less than a threshold amount of time of actively participating in the collaboration platform 120 (e.g., less than 50 hours of game time), etc.) are prevented from using the additional functionalities 121 to interact with other users with whom a trusted relationship has not been established.

In some implementations, an additional functionality 121 may include a messaging functionality that allows the first user and the second user to communicate using a messaging service (e.g., messaging module 128) via the collaboration platform 120 (e.g., posts, chats, personal messages, public messages, messaging in a virtual gaming environment). For example, the additional functionality 121 may allow users to transmit messages to each other. In another example, the additional functionality 121 allows users to transmit types of information (e.g., sensitive information, contact information, name, picture, voice recording, current location, unique identifiers (device ID), etc.) to each other that would otherwise be filtered by messaging module 128. Messaging module 128 may be further described below.

In some implementations, an additional functionality 121 may include a sharing functionality that allows the first user and the second user to share items with each other via the collaboration platform 120. For example, users of a gaming platform may have a sharing functionality that allows users to purchase, trade, or transfer virtual items, such as virtual currency, in a virtual gaming environment.

In some implementations, an additional functionality 121 may include a following functionality that allows the first user and the second user to follow each other into a game 122 or into a specific gaming environment of a game 122 hosted by the collaboration platform 120. For example, a first user may be participating in a game 122A, the following functionality may allow a second user to navigate to a profile page of the first user, select an option "Join Game" on the profile page, and the following functionality may place the second user in the game 122A (e.g., the specific gaming environment of game 122A where the first user is participating). In implementations, the following functionality may also include notification features that for example, notify the second user of the game in which the first user has moved or is currently participating.

In some implementations, an additional functionality 121 may include an invitation functionality that allows the first user and the second user to invite each other to a private game hosted by the collaboration platform 120. For example, a first user may create a private game and the invitation functionality may allow the first user to invite the second user to participate in the private game.

In some implementations, an additional functionality 121 may include a group functionality that allows the first user and the second user to join a group hosted by the collaboration platform 120. For example, the additional functionality 121 may allow the first user to invite the second user to a group where the first user is a group member or group creator. Members of a group may participate with each other to compete against a different group in a game 122, may participate with each in building within games 122 or creating games 122 (e.g., via creator module 126), may engage in discussion with each other (e.g., via messaging module 128, a group discussion), etc.

In some implementations, an additional functionality 121 includes an interaction functionality that allows the first user and the second user to interact with each other via the collaboration platform 120. For example, the base functionality may allow a user to participate in single-player games and the interaction functionality may allow the user to participate in multi-player games. In another example, the base functionality may allow a first user to compete against other users in a game 122 and the interaction functionality may allow a first user to work together with a second user to compete against other users in a game 122. In some implementations, collaboration platform 120 may include a game engine 124. In implementations, game engine 124 may be used for the development or execution of games 122. For example, game engine 124 may include a rendering engine ("renderer") for 2D, 3D, VR, or AR graphics, a physics engine or collision detection (and collision response), sound, scripting, animation, artificial intelligence, networking, streaming, memory management, threading, localization support, scene graph, or video support for cinematics.

In implementations, collaboration platform 120 may include a creator module 126. In implementations, creator module 126 may allow users to become creators to design or create environments in an existing game 122 or create new games or create new items within games or environments. In some implementations, a game 122 may have a common set of rules or common goal, and the environments of a game 122 share the common set of rules or common goal. In implementations, different games may have different rules or goals from one another. In some implementations, games 122 may have one or more environments where multiple environments may be linked. For example, a user may build a virtual environment that is linked to another virtual environment created by another user. A character of the virtual game may cross the virtual boarder to enter the adjacent virtual environment. In implementations, items may refer to objects that are used, created, shared or otherwise depicted in games 122 of the collaboration platform 120. For example, items may include a character, tools, clothing, buildings, vehicles, currency, and so forth.

In implementations, collaboration platform 120 may include authentication module 140. As further described herein, authentication module 140 may allow a user of collaboration platform 120 to establish a trusted relationship with one or more users of the collaboration platform 120. Authentication module 140 will be further described in the subsequent Figures. In implementations, server 130 or client devices 110 may implement some or all the functionality of authentication module 140.

The client devices 110A through 110B may each include computing devices such as personal computers (PCs), mobile devices (e.g., laptops, mobile phones, smart phones, tablet computers, or netbook computers), network-connected televisions, gaming consoles, etc. In some implementations, client devices 110A through 110B may also be referred to as "user devices." In implementations, one or more client devices 110 may connect to collaboration platform 120 via collaboration application 114 at any given moment.

In implementations, each client device 110 may include an instance of collaboration application 114. In one implementation, the collaboration application 114 may be an application that allows users to use and interact with collaboration platform 120, such as control a virtual character in a virtual game hosted by collaboration platform 120, or view or upload content, such as images, video items, web pages, documents, and so forth. In one example, the collaboration application 114 may be a web browser that can access, retrieve, present, or navigate content (e.g., virtual character in a virtual environment, etc.) served by a web server. The collaboration application 114 may render, display, or present the content (e.g., a web page, a media viewer) to a user. In an implementation, the collaboration application 114 may also include an embedded media player (e.g., a Flash® player) that is embedded in a web page. In another example, the collaboration application 114 may be a standalone application (e.g., a mobile application, app, or a gaming program) that allows users to interact with collaboration platform 120. According to aspects of the disclosure, the collaboration application 114 may be an application for users to create, edit, upload content to the collaboration platform 120 as well as interact with collaboration platform 120. As such, the collaboration applications 114 may be provided to the client devices 110A and 110B by the server 130 or collaboration platform 120. In another example, the collaboration applications 114 may be applications that are downloaded from the server 130.

In implementations, a user may log-in to collaboration platform 120 via collaboration application 114. The user may access a user account by providing log-in information (e.g., user name and password) where the user account is associated with one or more characters available to participate in one or more games 122 of collaboration platform 120. A first user of the client device 110A and a second user of the client device 110B may be logged into the collaboration platform prior to establishing a trusted relationship.

In general, functions described in one implementation as being performed by the collaboration platform 120 can also be performed on the client devices 110A through 110B, or server 130, in other implementations if appropriate. In addition, the functionality attributed to a particular component can be performed by different or multiple components operating together. The collaboration platform 120 can also be accessed as a service provided to other systems or devices through appropriate application programming interfaces, and thus is not limited to use in websites.

In implementations, collaboration platform 120 may include messaging module 128. In implementations, messaging module 128 may be a system, application, or module that allows users to exchange electronic messages via a communication system, such as network 105. Messaging module 128 may be associated with collaboration application 114 (e.g., module of collaboration application 114 or be a separate application). In implementations, users may interface with messaging module 128 and exchange electronic messages among users of collaboration platform 120. Messaging module 128 may be, for example, an instant messaging application, a text messaging application, an email application, a voice messaging application, a video messaging application, or a combination of multiple applications, among others.

In implementations, messaging module 128 may facilitate the exchange of electronic messages between users. For example, a user may be logged into a messaging application on client device 110A, and another user may be logged into a messaging application on client device 110B. The two users may start a conversation, such as an instant messaging conversation (e.g., via messaging module 128). Messaging module 128 may help facilitate the messaging conversation by sending and receiving the electronic messages between the users of collaboration platform 120.

In some implementations, the messaging module 128 may prohibit users that have not established a trusted relationship from messaging each other. In some implementations, the messaging module 128 prohibits a user from a subset of users (e.g., minors, users with less than full privileges) from messaging other users with whom the user has not established a trusted relationship. The messaging module 128 may prevent transfer of sensitive information, such as contact information (e.g., phone numbers, email addresses, addresses, websites, etc.) or identifying information (e.g., photo, name, current location), between users of collaboration platform 120 (e.g., between users that have not established a trusted relationship). For example, messaging module 128 may block messages and posts that contain contact information or filter contact information from messages and posts.

Responsive to the collaboration platform 120 preventing contact information from being shared between users that have not established a trusted relationship and the collaboration platform performing a disable operation (e.g., disable operation 214 of FIGS. 2A-C) during the establishing of a trusted relationship, a first user being able to communicate (e.g., the first authentication code to) with the second user outside of the collaboration platform 120 implies that the first user and second user are not just "virtual friends" on the collaboration platform 120. Having an alternative form of communication outside of the collaboration platform 120 implies that the first user and the second user know each other outside of the collaboration platform 120 and may be real-life friends. The collaboration platform 120 providing additional functionalities for interactions between users that have an alternative form of communication outside of the collaboration platform 120 (e.g., implied real-life friends) is less susceptible to abuse than providing additional functionalities to users that only know each other via the collaboration platform 120.

For the sake of illustration, authentication module 140 is implemented on server 130. In other implementations, authentication 140 may in part or wholly be implemented on client device 110. In other implementations, authentication module 140 may in part or wholly be implemented on collaboration platform 120. In other implementations, authentication module 140 may operate on one or more of client devices 110, server 130, or collaboration platform 120 and may work in conjunction to perform the operations described herein.

Although implementations of the disclosure are discussed in terms of collaboration platforms, implementations may also be generally applied to any type of social network providing connections between users.

In situations in which the systems discussed herein collect personal information about users, or may make use of personal information, the users may be provided with an opportunity to control whether the collaboration platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2A:
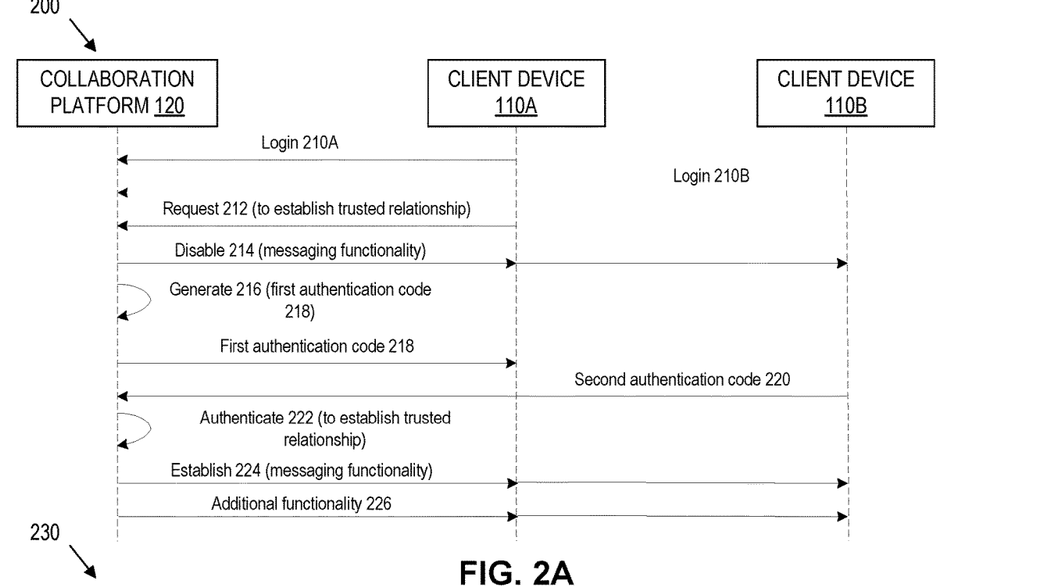
FIGS. 2A-C are diagrams of operations of establishing a trusted relationship, in accordance with some implementations.
Figure 2B:
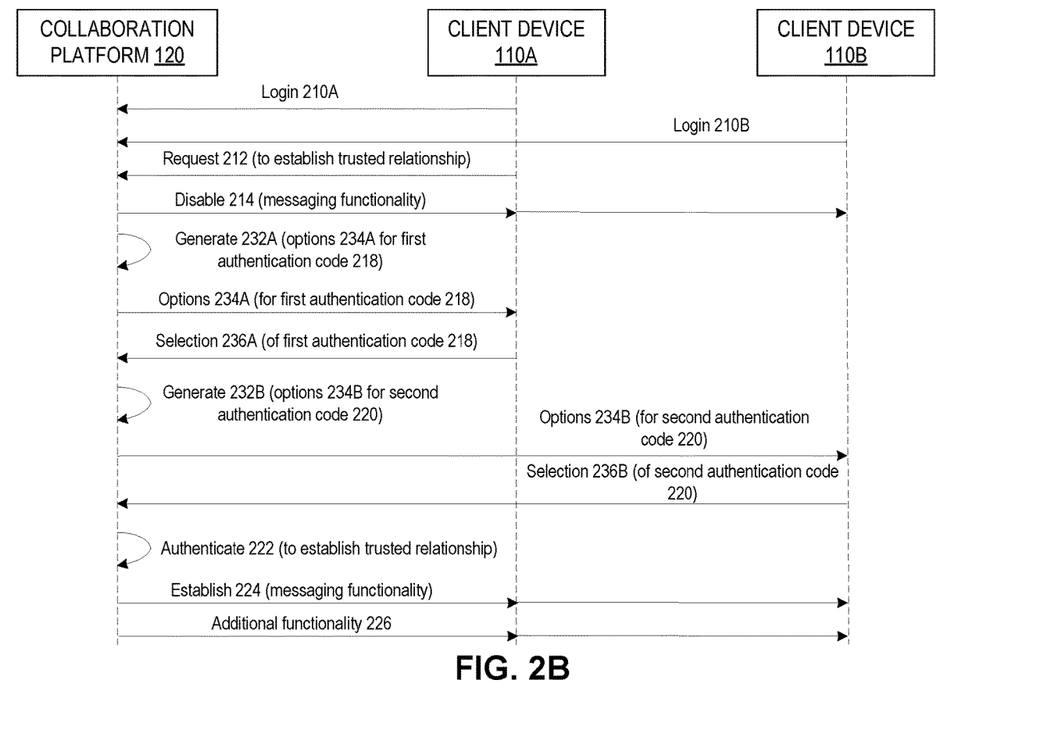
Figure 2C:
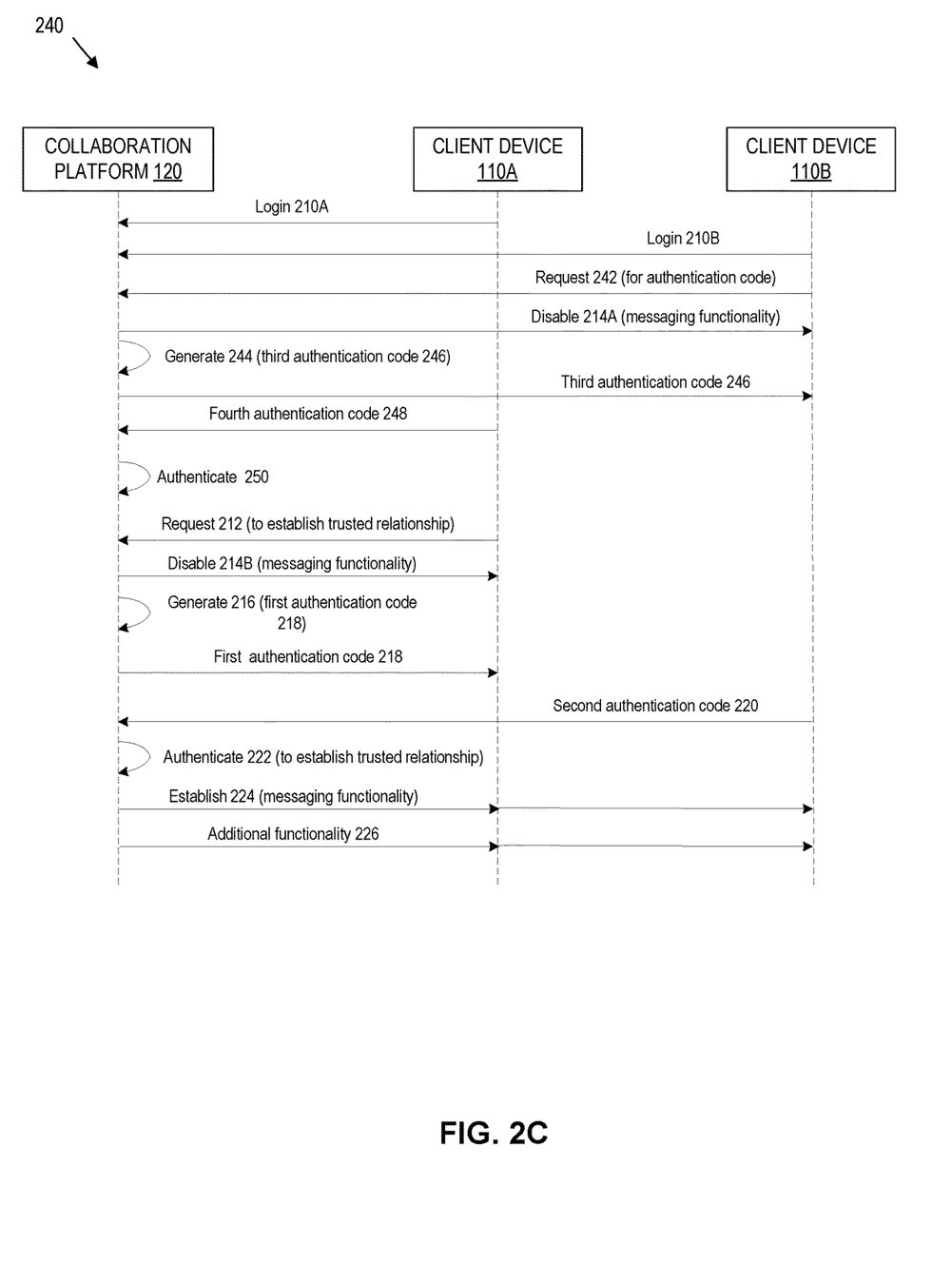

FIGS. 2A-C are diagrams of operations of establishing a trusted relationship, in accordance with some implementations. Systems 200, 230, and 240 may include similar components as system architecture 100 as described with respect to FIG. 1. It may be noted that components of FIG. 1 may be used herein to help describe FIGS. 2A-C. In implementations, collaboration platform 120 may implement the authentication module 140 to perform some or all the operations. In other implementations, collaboration platform 120 (using authentication module 140) may interact with client devices 110 (using respective authentication modules 140) to perform operations described with respect to FIGS. 2A-C. For purpose of illustration, rather than limitation, operations described as performed by collaboration platform 120 may be performed by any component of collaboration platform 120, unless otherwise described. For purposes of illustration, rather than limitation, operations performed by client device 110 may be performed by collaboration application 114 or authentication module 140. It may be noted that for the purposes of illustration, rather than limitation, "first user" is a user associated first user account (of the collaboration platform 120) and with client device 110A and "second user" is a user associated with second user account and with client device 110B. The operations described with respect to FIGS. 2A-C are shown to be performed serially for the sake of illustration, rather than limitations. It may be noted that in implementations the operations may be performed in any order, may be performed multiple times, or may include the same, fewer, or additional operations.

In implementations, establishing a trusted relationship may include an attempt by a first user to establish a trusted relationship with a second user that the first user knows outside of the collaboration platform 120. In implementations, users knowing each other outside of the collaboration platform 120 may refer to the ability to communicate with each other without using the collaboration platform 120 and without transmitting contact information via the collaboration platform 120. In some implementations, the ability to communicate with each other without using the collaboration platform 120 refers to a physical closeness between two users or closeness of the client devices 110 of the users (e.g., users can see each other's devices). In some implementations, the ability to communicate with each other without using the collaboration platform 120 refers to users having the contact information of each other (e.g., phone number, email address, etc.).

Returning to FIG. 2A, in implementations login operation 210A may be an operation where a first user of client device 110A performs a login to collaboration platform 120. In one example, the first user may supply login information, such as user account information (e.g., username and password) to collaboration platform 120 via collaboration application 114 or authentication module 140. In implementations, collaboration platform 120 may verify the login information and responsive to the verification, allow the first user access to collaboration platform 120 and user account content associated with the first user account. In other implementations, the second user of client device 110B may perform a similar login operation 210B as described above with respect to login operation 210A.

In implementations, a first user may submit a request 212 to establish a trusted relationship to collaboration platform 120. In implementations, the request 212 may be a request from client device 110A to establish a trusted friendship with a second user of collaboration platform 120 with whom the first user has already established a friendship via the collaboration platform 120. In implementations, the first user may not have established a friendship with the second user via the collaboration platform 120. In implementations, the request 212 may be a request from client device 110A to establish a trusted friendship with a second user of collaboration platform 120 with whom the first user has interacted via the collaboration platform 120. In some implementations, the first user is logged in prior to submitting the request 212. In an implementation, the request 212 includes user account information to help identify the user account associated with the user request. In some implementations, the request 212 may include an indicator of the second user (e.g., username, screen name, etc.) with whom the first user is attempting to establish a trusted relationship via the collaboration platform 120.

In one example, the first user of client device 110A may access a "trusted relationship" section ("trusted friend mode," "crypto friend mode," a module, a page, etc.) of collaboration application 114 or authentication module 140. In some implementations, the first user may access a friend list of the first user displayed via the trusted relationship section and may select the second user from one of the friends in the friend list, which initiates collaboration application 114 (or authentication module 140) to send a request 212 to collaboration platform 120. In some implementations, the first user may provide an identifier (e.g., username, credentials, etc.) of the second user via the trusted relationship section, which initiates collaboration application 114 (or authentication module 140) to send a request 212 to collaboration platform 120.

In implementations, collaboration platform 120 may keep a record of the request 212. In implementations, collaboration platform 120 may record the request 212 by associating the request 212 with the particular user account (e.g., first user account of the first user). In implementations, collaboration platform 120 may record a status identifier that indicates a state of the request 212 (e.g., pending, canceled, paused, etc.) The status identifier may be associated with the particular user account (e.g., first user account of the first user). In an example, collaboration platform 120 responsive to receiving the request 212 may update a status associated with a first user account to indicate that the request 212 is currently pending (e.g., pending status).

In implementations, collaboration platform 120 may perform a disable operation 214 to disable messaging functionality between the first user and the second user. In some implementations, the disable operation 214 is responsive to receiving the request 212. In some implementations, the disable operation 214 is prior to receiving of the request 212.

In some implementations, the collaboration platform 120 performing of the disable operation 214 includes disabling communications via the collaboration platform 120 (e.g., messaging module 128, collaboration application 114A). In some implementations, the collaboration platform 120 performing the disable operation includes disabling communications between client device 110A and client device 110B. For example, the collaboration platform 120 may cancel the request to establish the trusted relationship if either of the client devices 110A or 100B navigates to a different application than the collaboration application 114 before the trusted relationship is established between the respective users of the client devices 110. In another example, the collaboration platform 120 may cancel the request to establish the trusted relationship if either of the client devices 110A or 110B navigates away from the trusted relationship section in the collaboration applications 114 before the trusted relationship is established between the respective users of the client devices 110. In another example, the collaboration platform 120 disables communications of client devices 110 (e.g., via a module or a plugin of operating systems of the client devices 110) until the trusted relationship is established between the respective users of the client devices 110 or the request to establish the trusted relationship is canceled (e.g., the request times out, user input of canceling the request is received from a client device 110, etc.).

In some implementations, messaging functionality may not be available to users that have not established a trusted relationship.

In implementations, responsive to receiving the request 212, collaboration platform 120 may perform a generating operation 216 to generate the first authentication code 218. The generating operation 216 to generate an authentication code 218 may include generating one or more of a numeric code, an alphabetic code, an alphanumeric code, a pattern, an image, etc. Substantially each time the collaboration platform 120 performs generating operation 216 to generate an authentication code 218, the collaboration platform 120 may generate a different authentication code (e.g., a randomly generated authentication code, a pseudo-randomly generated authentication code, etc.).

In implementations, responsive to performing a generating operation 216 to generate the first authentication code 218, the collaboration platform 120 may store a copy of the first authentication code 218 in the authentication code cache 107 of the data store 106. In some implementations, the authentication codes may include one or more of a pin code (e.g., a numeric code), a series of images (e.g., pattern quizzes), a drawing, tracing (e.g., connecting of dots), a password (e.g., the collaboration platform 120 generates a different password substantially each time generating operation 216 is performed), etc.

In implementations, subsequent to performing generating operation 216 to generate the first authentication code 218, the collaboration platform 120 may transmit the first authentication code 218 to the client device 110A where the first authentication code 218 is displayed.

In some implementations, the first user of the client device 110A communicates the first authentication code to the second user of the client device 110B outside of the collaboration platform 120. For example, the first user may communicate the first authentication code to the second user via another application (e.g., messaging application, instant messaging application, telephone application, video conferencing application, etc.) that is not part of the collaboration platform 120. In another example, the first user communicates the first authentication code to the second user by showing the display screen of the client device 110A to the second user. In some implementations, the first user of the client device 110A communicates the first authentication code to the second user of the client device 110B without using the client device 110A and client device 110B. For example, the first user and the second user may be proximate to each other (e.g., in the same room) and the first user may communicate the first authentication code verbally. In another example, the first user may communicate the first authentication code to the second user using client devices other than client devices 110A and 110B (e.g., client devices 110A and 110B are desktop computers and the first user communicates the first authentication code to the second user using mobile devices).

In implementations, subsequent to the collaboration platform 120 transmitting the first authentication code 218 to the client device 110A, the collaboration platform 120 receives a second authentication code 220 from the client device 110B. In implementations, the collaboration platform may store the second authentication code 220 in the authentication code cache 107 of the data store 106.

In implementations, the collaboration platform 120 determines the second authentication code received from the client device 110B matches (e.g., is the same as, is substantially the same as) the first authentication code transmitted to the client device 110A to authenticate 222 the second user to establish a trusted relationship between the first user and the second user. The collaboration platform 120 may retrieve the first authentication code or second authentication code from the authentication code cache 107 of the data store 106.

In implementations, the collaboration platform 120 performs an establishing operation 224 to provide messaging functionality between the first user and the second user. In some implementations, establishing messaging functionality may include re-establishing messaging functionality (e.g., messaging functionality was available before being disabled). For example, the establishing operation 224 may re-establish the messaging functionality (e.g., the messaging functionality between the first user and second user was available prior to the disable operation 214). In some implementations, establishing messaging functionality may include enabling messaging functionality (messaging functionality was not available previously). For example, the establishing operation 224 may establish the messaging functionality (e.g., users cannot directly message each other until after the authentication operation 222).

In implementations, the collaboration platform 120 provides one or more of the additional functionalities 226 (as described above with respect to FIG. 1) between the first user and the second user via the collaboration platform 120.

FIG. 2B is a diagram of operations of establishing a trusted relationship, in accordance with some implementations. For purposes of clarity and simplicity, operations in FIG. 2B that have the same numbering as operations in FIG. 2A may have the same functionalities as the corresponding operations described in relation to FIG. 2A.

In implementations, the collaboration platform 120 performs a generating operation 232A to generate options 234A for first authentication code 218. In implementations, the collaboration platform 120 transmits the options 234A to the client device 110A. Collaboration platform 120 transmitting the options 234A to the client device 110A may cause the client device 110A to display the options 234A (e.g., via collaboration application 114, etc.).

In implementations, subsequent to causing the client device 110A to display the options 234A, the collaboration platform 120 may receive selection 236A of the first authentication code 218 from the client device 110A. In some implementations, the options 234A may include a series of images for the first user to select. For example, the client device 110A may display a first set of images (e.g., the collaboration platform 120 generates a different set of images each time generating operation 232A is performed) at a first point in time and the selection 236A may include first user selection of one or more of the first set of images.

For example, the first set of images may include a red image in the upper left, a blue image in the upper right, and a yellow image in the lower left and the first user selection may be selection of the yellow image in the lower right. A user may select one or more of the set of images. In some implementations, after the first user selection, the client device 110A may display a second set of images at a second point in time and the selection 236A may further include a second user selection of one or more of the second set of images. The selection 236A may include the first user selection, the second user selection, and so forth. By displaying different images each time generating operation 232A is performed, even if the first user were to make a guess as to what images were to be displayed and communicate the guessed images to the second user via the collaboration platform 120 prior to the collaboration platform 120 performing the disable operation 214, the generated series of images would likely be different than the guessed images. The second user would have difficulty circumventing authentication 222 by using the guessed images supplied by the first user. It may be noted that images are used for purposes of illustration, rather than limitation. In other implementations, the options 234A may be other than images, such as sounds, characters, or otherwise.

In some implementations, the options 234A may include two or more features (e.g., color, image, location, etc.) and not all of the features are compared between selection 236A and selection 236B (e.g., only one of the features is compared). For example, the options 234A may include a series of randomly generated images displayed in randomly generated locations. The selection 236A may include the images but not the locations of the images, or vice versa. By displaying both randomly generated images in randomly generated locations, even if the first user were to communicate a particular location of selections via the collaboration platform 120 to the second user (e.g., all selections are top-right corner) prior to the collaboration platform 120 performing the disable operation 214, the generated series of images may not be located in the guessed locations because for example, the locations of the images displayed via the client device 110A may be different than the locations of the same images displayed via the client device 110B. The second user would have difficulty circumventing authentication 222 by using the location supplied by the first user.

In implementations, the collaboration platform 120 receives selection 236A of the first authentication code 218 from the client device 110A. In one example, the selection 236A is an authentication code 218. In another example, the selection 236A includes one or more drawings (e.g., one or more shapes) input via the corresponding user interface. In another example, the selection 236A may include one or more tracings (e.g., tracing one of the generated images) input via the corresponding user interface. In another example, the selection 236A may include input of text as an answer to prompts displayed via the user interfaces of the client devices 110.

In implementations, the collaboration platform 120 performs a generating operation 232B to generate options 232B for second authentication code 220. In implementations, the collaboration platform 120 transmits the options 234B to the client device 110B. In implementations, the collaboration platform 120 may cause the client device 110B to display an authentication interface at client device 110B. In some implementations, the authentication interface may display a series of images from which the second user may select and that include at least the images indicated in the user input 232 (and possibly other images). In some implementations, the sending of the options 234B to the client device 110B may be similar to the sending the options 234A to the client device 110A.

In implementations, the collaboration platform 120 receives selection 236B of the second authentication code 220 from the client device 110B. In implementations, the selection 236B includes user input from the second user in a manner similar as described with respect to selection 236A.

For example, the client device 110B may display, via the authentication interface, a generated set of images that include at least the images from the first user selection of the selection 236A. To establish the trusted relationship, the second user is to select the same images that the first user selected. In some implementations, the first user is to provide the selection 236A (e.g., including first user selection, second user selection, and so forth) and then the second user is to provide selection 236B that matches the selection 236A (e.g., the same images that were selected in the first user input) to establish a trusted relationship. In some implementations, the first user and the second user are to provide matching selection 236 at substantially the same time (e.g., both select a red image of the displayed images within a threshold amount of time, such as 1 or more seconds). In some implementations, the first user is to provide the selection 236A and then the second user is to provide the selection 236B that matches the selection 236A prior to the first user providing the selection 236B.

In some implementations, the second user mimics the selection 236A to provide the selection 236B. For example, the second user may mimic selection of an authentication code 218. In another example, the second user mimics one or more drawings (e.g., one or more shapes) input via the corresponding user interface. In another example, the second user mimics one or more tracings (e.g., tracing one of the generated images) input via the corresponding user interface. In another example, the second user mimics input of text as an answer to prompts displayed via the user interfaces of the client devices 110.

In implementations, the collaboration platform 120 determines the selection 236B matches (e.g., is the same as, is substantially the same as) the selection 236A to authenticate 222 the second user to establish a trusted relationship between the first user and the second user. The collaboration platform 120 may retrieve the selection 236A or the selection 236B from the authentication code cache 107 of the data store 106. In some implementations, the selection 236 includes one feature (e.g., color) and not multiple features (e.g., location, image, etc.) and the collaboration platform 120 determines that the selections 236 match (e.g., determine that the colors of the images match) to establish a trusted relationship. For example, the collaboration platform 120 determines the color of the first image received from the client device 110A matches the color of the second image received from the client device 110B although the two images may be displayed in different locations on the client devices 110, the two images may be different images that are the same color, etc.). Even if the first and second users were to choose images in the same location (e.g., upper left corner), the selections 236 of the authentication code may correspond to a different parameter (e.g., color) and not location.

In some implementations, after the collaboration platform 120 determines images selected via the client devices 110 match, the collaboration platform 120 may do one or more iterations of causing the client device 110A to display another set of images, receiving a selection from the client device 110A, causing the client device 110B to display yet another set of images, receiving a selection from the client device 110B, and determining the selections match. Upon determining that the corresponding selections in each of the iterations match, the collaboration platform 120 may establish a trusted relationship between the first user and the second user.

FIG. 2C is a diagram of operations of establishing a trusted relationship, in accordance with some implementations. For purposes of clarity and simplicity, operations in FIG. 2C the have the same numbering as operations in FIG. 2A or FIG. 2B may be similar to the corresponding operations described with respect to FIG. 2A or FIG. 2B. FIGS. 2A-B may include authenticating the second user via authentication codes prior to establishing the trusted relationship. FIG. 2C may include authenticating the first user via authentication codes and authenticating the second user via different authentication codes prior to establishing the trusted relationship.

In implementations, a second user may submit a request 242 for an authentication code to collaboration platform 120. In implementations, the request 242 may be a request from client device 110B to establish a trusted friendship with a first user of collaboration platform 120. In implementations, the request does not include a request to establish a trusted relationship with a particular user of the collaboration platform. In some implementations, the second user is logged in prior to submitting the request 242 for an authentication code. In an implementation, the request 242 includes user account information to help identify the user account associated with the user request. In some implementations, the request 242 may include an indicator of a first user with whom the second user is attempting to establish a trusted relationship via the collaboration platform 120.

In one example, the second user of client device 110B may access the trusted relationship section of collaboration application 114. In some implementations, the second user may select a user input control, such as a "generate an authentication code" button, which initiates the collaboration application 114 of client device 110B to send a request 242 for an authentication code to the collaboration platform 120.

In implementations, responsive to receiving the request 242 for an authentication code, collaboration platform 120 may perform disable operation 214A to disable messaging functionality of the second user and perform generating operation 244 to generate the third authentication code 246. In implementations, the collaboration platform may perform the disable operation 214A for the first user via the collaboration platform 120 or via the client device 110B.

In implementations, subsequent to performing the disable operation 214A of the second user and performing the generating operation 244 to generate the third authentication code 246, the collaboration platform may transmit the third authentication code 246 to the client device 110B.

In implementations, the second user may communicate the third authentication code 246 to the first user outside of the collaboration platform 120 or without using the client device 110B.

In implementations, subsequent to the collaboration platform 120 transmitting the third authentication code 246 to the client device 110B, the collaboration platform 120 receives a fourth authentication code 248 from the client device 110A.

In one example, the first user of client device 110A may access a trusted relationship section of collaboration application 114 to enter the fourth authentication code 248. In some implementations, the first user may input the fourth authentication code 248 via the collaboration application 114 of client device 110A to send the fourth authentication code 248 to the collaboration platform 120.

In implementations, the collaboration platform 120 determines the fourth authentication code received from the client device 110A matches the third authentication code 246 transmitted to the client device 110B. Responsive to the matching, collaboration platform 120 may authenticate 250 the first user. By authenticating 250 the first user, collaboration platform 120 may subsequently allow the first user to request 212 establishing a trusted relationship with the second user. It may be noted that prior to authentication 250, the first user may be prevented from sending a request to establish a trusted relationship with the second user. For example, responsive to authenticating 250 the first user, the trusted relationship section of collaboration application 114 displayed via the client device 110A is unlocked to allow the first user to send a request 212 to establish a trusted relationship with the second user to collaboration platform 120.

In some implementations, responsive to receiving the request 212 to establish the trusted relationship, the collaboration platform 120 performs the disable operation 214B to disable the messaging functionality of the client device 110A, performs a generating operation 216 to generate a first authentication code, and transmits the first authentication code 218 to the client device 110A. In some implementations, responsive to authenticating 250 the first user and without receiving the request 212 to establish the trusted relationship, the collaboration platform 120 performs the disable operation 214B to disable the messaging functionality of the client device 110A, performs a generating operation 216 to generate a first authentication code, and transmits the first authentication code 218 to the client device 110A. In implementations, the transmitting of the fourth authentication code 248 may take the place of transmitting a request 212 to establish trusted relationship.

In implementations, operations 216-226 of FIG. 2C may be the same as or substantially similar to operations 216-226 of FIG. 2A. In implementations, operations 216-226 of FIG. 2C may be the same as or substantially similar to operations 216-218, 232-234, and 220-226 of FIG. 2A. In implementations, the authenticating 250 may be authenticating the first user to transmit the request to establish the trusted relationship and the authenticating 222 may be authenticating the second user to accept the request to establish the trusted relationship.

Figure 3:
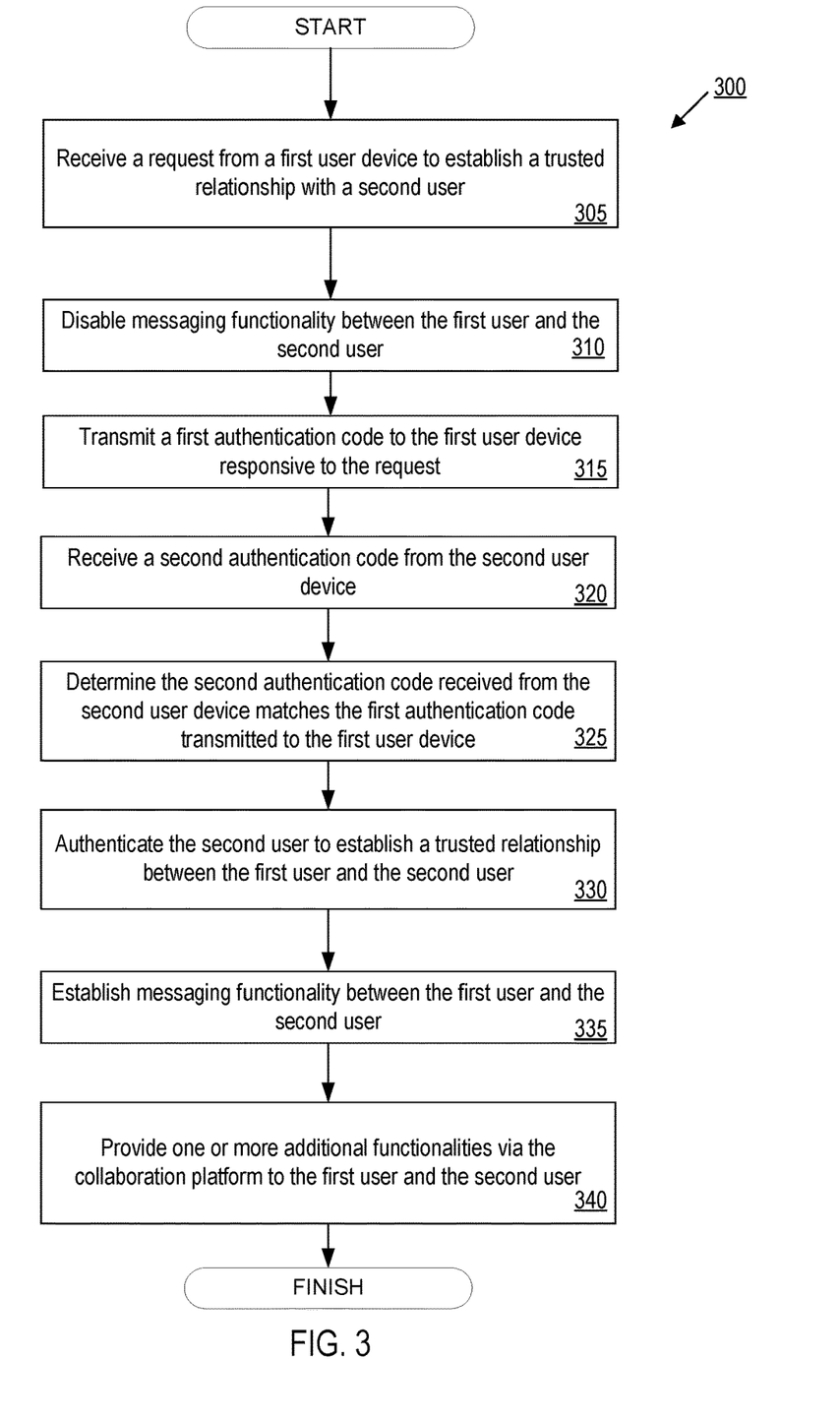
FIG. 3 is a flow diagram illustrating a method for establishing a trusted relationship between users of a collaboration platform, in accordance with some implementations.

FIG. 3 is a flow diagram illustrating method 300 for establishing a trusted relationship between users of a collaboration platform, in accordance with some implementations. Method 300 may be performed by processing logic that includes hardware (e.g., circuitry, dedicated logic, programmable logic, microcode), software (e.g., instructions run on a processing device to perform hardware simulation), or a combination thereof. In one implementation, authentication module 140 of collaboration platform 120 may perform some or all the operations described herein. In some implementations, authentication module 140 executing at the collaboration platform 120, server 130, client device 110, or combination thereof may perform some or all the operations. It may be noted that components of FIG. 1 may be used to help illustrated FIG. 3. It may be further noted that in some implementations, the same, additional, or fewer operations may be performed in the same or different order as described with respect to FIG. 3.

Method 300 begins at block 305 where processing logic receives, by the collaboration platform 120, a request from the first user device (e.g., client device 110A) to establish a trusted relationship with the second user of the collaboration platform 120. In some implementations, the processing logic receives the request in response to the first user device launching the collaboration application 114A (e.g., by logging in), navigating to a trusted relationship mode ("trusted friend mode," "crypto friend mode," etc.), and submitting a trusted relationship request using the collaboration application 114A.

In some implementations, the first user and the second user have established a relationship via the collaboration platform 120 (e.g., friends or connections in the collaboration platform 120), but may not have established a trusted relationship via the collaboration platform 120. In some implementations, the first user and the second user have not established a relationship via the collaboration platform 120 (e.g., they are real-life friends but not virtual friends).

At block 310, the processing logic may disable messaging functionality between the first user and the second user. In some implementations, the processing logic disables messaging functionality in response to receiving the request to establish the trusted relationship. In some implementations, the processing logic disables messaging functionality prior to receiving the request to establish a trusted relationship with a second user (e.g., prior to block 305).

In one implementation, the processing logic disables messaging functionality via the collaboration platform 120 (e.g., via messaging module 128) specifically between the first user and the second user (e.g., the first user and the second user cannot message each other). In another implementation, the processing logic disables messaging functionality via the collaboration platform 120 (e.g., via messaging module 128) for the first user and the second user (e.g., the first user and the second user cannot communicate with any users via the collaboration platform 120). In one implementation, the processing logic disables messaging functionalities of the first user device and the second user device. For example, the processing logic may disable messaging functionalities via other applications or programs that operate outside of the collaboration platform 120 (e.g., texting, instant messaging, telephone calls, video conferencing, etc.). For example, the collaboration platform 120 may use an application programming interface (API) to disable messaging functionalities of other applications that operate outside of the collaboration platform 120. In some implementations, the processing logic cancels the request to establish the trusted relationship in response to the first user device or second user device navigating to a different application (e.g., a messaging application, etc.) other than the collaboration application 114. In some implementations, the processing logic cancels the request to establish the trusted relationship in response to the first user device navigating away from the trusted relationship mode of the collaboration application 114A (e.g., navigating to a different portion of the collaboration application 114A).

In still another implementation, the messaging functionality (via the collaboration platform 120) between the first user and the second user is maintained, but the messaging functionality blocks attempts by the first or second user to share the authentication code (e.g., filters out the authentication code sent in any message).

In some implementations, the messaging functionality (via the collaboration platform 120) between the first user and the second user is provided only after block 330 (e.g., messaging functionality between the first user and the second user is not enabled prior to block 330). For example, a user (e.g., a minor) may only be able to directly message other users (e.g., via the collaboration platform 120) with whom the user has established a trusted relationship.

At block 315, processing logic transmits a first authentication code to the first user device responsive to the trusted relationship request from the first user device. The processing logic may cause the first user device to display the first authentication code via the collaboration application 114A (e.g., via the trusted relationship mode of the collaboration application 114A). In some implementations, the authentication code may include one or more of a numeric code, alphabetic code, alphanumeric code, pattern, or image(s) (e.g., the collaboration platform 120 generates a different authentication code prior to transmitting the first authentication code). In some implementations, the processing logic may cause the first user device to display a series of generated images in a first pattern.

At block 320, processing logic receives a second authentication code from the second user device (e.g., client device 110B). The second user may input the second authentication code via the collaboration application 114B (e.g., trusted friend mode) running on the second user device. It may be noted that in implementations where messaging functionality is disabled between the first and second user, that the first user may communicate the first authentication code to the second user outside of the collaboration platform 120. In one implementation, the first user and the second user are proximate each other (e.g., the second user can see the first authentication code displayed via the first user device or the first user vocally communicates the first authentication code to the second user) and the second user enters the first authentication code via the second user device. In another implementation, the first user communicates the first authentication code to the second user via a third user device (e.g., the first user device is a computer and the third user device is a telephone). In another implementation, the first user communicates the first authentication code to the second user via a different application other than the collaboration application 114A (e.g., a messaging application that does not use the collaboration platform 120). In some implementations, the collaboration platform 120 may restrict the communication of contact information (e.g., telephone number, email, address) between users, so that the first user can only communicate with the second user outside of the collaboration platform 120 if the first user knows the second user outside of the collaboration platform 120 (e.g., the first user and second user are friends outside of the collaboration platform 120).

At block 325, processing logic determines the second authentication code received from the second user device matches the first authentication code transmitted to the first user device. The processing logic may compare the second authentication code with the first authentication code (e.g., to determine the authentication codes match or substantially match). In some implementations, responsive to determining that the first and the second authentication code does not match, processing logic denies or terminates the trusted friendship request.

At block 330, processing logic authenticates the second user to establish a trusted relationship between the first user and the second user of the collaboration platform 120.

At block 335, the processing device may establish messaging functionality between the first user and the second user (e.g., via the collaboration platform 120) in response to establishing the trusted relationship between the first user and the second user. In some implementations, at block 335, the processing device re-establishes the messaging functionality between the first user and the second user in response to establishing the trusted relationship between the first user and the second user (e.g., the first user and the second user could message each other prior to block 310). In some implementations, at block 335, the processing device provides the messaging functionality between the first user and the second user in response to establishing the trusted relationship (e.g., the messaging functionality between the first user and the second user was not available prior to block 330).

At block 340, the processing device may provide one or more additional functionalities 121 via the collaboration platform 120 to the first user and the second user in response to establishing the trusted relationship between the first user and the second user. The additional functionalities 121 may not be available to users that have not established a trusted relationship via the collaboration platform 120 (e.g., users that are not connections via the collaboration platform 120, users in an un-trusted relationship via the collaboration platform). In some implementations, a user is provided the one or more additional functionalities only with other users with which the user has established a trusted relationship. In some implementations, a minor (e.g., a user under 13 years old) is provided the one or more additional functionalities 121 only with other users with which the minor has established a trusted relationship.

Figure 4:
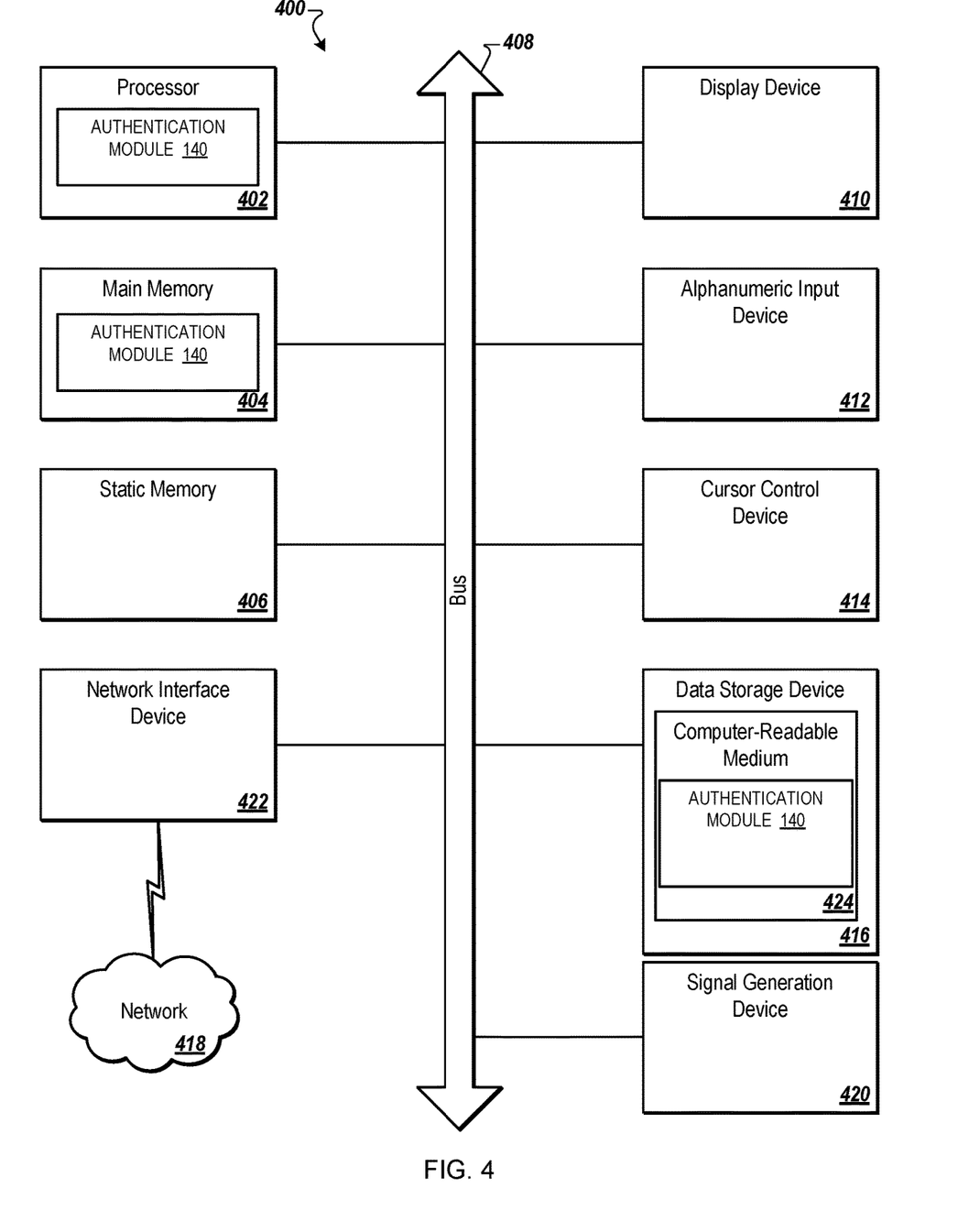
FIG. 4 is a block diagram illustrating an exemplary computer system, according to some implementations.

FIG. 4 is a block diagram illustrating an exemplary computer system 400. The computer system 400 executes one or more sets of instructions that cause the machine to perform any one or more of the methodologies discussed herein. Set of instructions, instructions, and the like may refer to instructions that, when executed computer system 400, cause computer system 400 to perform one or more operations of authentication module 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute instructions of the system architecture 100 and the authentication module 140 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a non-transitory computer-readable storage medium 424 (e.g., non-transitory machine-readable storage medium) on which is stored the sets of instructions of the system architecture 100 and authentication module 140 embodying any one or more of the methodologies or functions described herein. The sets of instructions of the system architecture 100 and authentication module 140 may also reside, completely or at least partially, within the main memory 404 and/or within the processing device 402 during execution thereof by the computer system 400, the main memory 404 and the processing device 402 also constituting computer-readable storage media. The sets of instructions may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "establishing," "receiving," "transmitting," "authenticating," "disabling," "re-establishing," "establishing," "providing," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

We claim:

1. An apparatus comprising:
a memory; and
a processing device, coupled to the memory, to:
establish a trusted relationship, via a collaboration platform, between a first user account associated with a first user of the collaboration platform and a second user account associated with a second user of the collaboration platform, wherein to establish the trusted relationship, the processing device to:
receive, by the collaboration platform and from a first user device associated with the first user, a request by the first user account to establish the trusted relationship with the second user account associated with the second user of the collaboration platform;
responsive to the request by the first user account to establish the trusted relationship with the second user account, transmit a first authentication code to the first user device;
receive a second authentication code from a second user device associated with the second user; and
responsive to determining that the second authentication code received from the second user device matches the first authentication code transmitted to the first user device, authenticate the second user to establish the trusted relationship between the first user account and the second user account of the collaboration platform; and
responsive to establishing the trusted relationship, record a status identifier indicating a state of the request, wherein the state of the request is indicative of the trusted relationship.

2. The apparatus of claim 1, wherein, responsive to establishing the trusted relationship, the processing device is to provide a messaging functionality between the first user account and the second user account via the collaboration platform, wherein the messaging functionality allows the first user account to communicate with the second user account using a messaging service via the collaboration platform.

3. The apparatus of claim 1, wherein the processing device is further to:
disable messaging functionality between the first user account and the second user account via the collaboration platform prior to transmitting the first authentication code to the first user device; and
establish the messaging functionality between the first user account and the second user account via the collaboration platform after establishing the trusted relationship between the first user account and the second user account.

4. The apparatus of claim 1, wherein the first authentication code comprises one or more of a numeric code, an alphabetic code, an alphanumeric code, a pattern, or an image.

5. The apparatus of claim 1, wherein the first authentication code comprises a series of randomly generated images in a first pattern and the second authentication code comprises the series of randomly generated images in a second pattern, wherein to determine that the second authentication code matches the first authentication code, the processing device is to determine that the series of randomly generated images in the second pattern matches the series of randomly generated images in the first pattern.

6. The apparatus of claim 1, wherein to establish the trusted relationship, the processing device is further to:
receive, by the collaboration platform, a second request from the second user device to establish the trusted relationship with the first user account of the collaboration platform;

responsive to the second request, transmit a third authentication code to the second user device; and receive a fourth authentication code from the first user device, wherein authenticating the first user and the second user to establish the trusted relationship is further in response to determining the fourth authentication code matches the third authentication code.

7. The apparatus of claim 1, wherein at least one of the first user or the second user is a minor and responsive to establishing the trusted relationship, the processing device is to provide an additional functionality to the first user account and the second user account via the collaboration platform.

8. The apparatus of claim 1, wherein responsive to establishing the trusted relationship, the processing device is to provide additional functionality to the first user account and the second user account via the collaboration platform, the additional functionality comprising one or more of a messaging functionality that allows the first user account to communicate with the second user account using a messaging service in a virtual gaming environment or a sharing functionality that allows the first user account to share virtual items with the second user account in the virtual gaming environment.

9. The apparatus of claim 1, wherein responsive to establishing the trusted relationship, the processing device is to provide additional functionality to the first user account and the second user account via the collaboration platform, the additional functionality comprising one or more of a following functionality that allows a first character of the first user account and a second character of the second user account to follow each other into a game hosted by the collaboration platform, an invitation functionality that allows the first user and the second user to invite each other to a private game hosted by the collaboration platform, or a group functionality that allows the first character of the first user account and the second character of the second user account to join a group hosted by the collaboration platform.

10. The apparatus of claim 1, wherein a relationship between the first user account and the second user account via the collaboration platform exists prior to establishing the trusted relationship.

11. The apparatus of claim 1, wherein the first user account and the second user account are logged into the collaboration platform prior to establishing the trusted relationship.

12. The apparatus of claim 1, wherein the collaboration platform is a gaming platform, wherein the first user and the second user are to engage with a game hosted by the gaming platform.

13. A non-transitory machine-readable storage medium storing instructions that, when executed cause a processing device to perform operations comprising:

establishing a trusted relationship, via a collaboration platform, between a first user account associated with a first user of the collaboration platform and a second user account associated with a second user of the collaboration platform, wherein the establishing of the trusted relationship comprises:

receiving, by the collaboration platform and from a first user device associated with the first user, a request by the first user account to establish the trusted relationship with the second user account associated with the second user of the collaboration platform;

responsive to the request by the first user account to establish the trusted relationship with the second user account, transmitting a first authentication code to the first user device;

receiving a second authentication code from a second user device associated with the second user; and responsive to determining that the second authentication code received from the second user device matches the first authentication code transmitted to the first user device, authenticating the second user to establish the trusted relationship between the first user account and the second user account of the collaboration platform; and responsive to establishing the trusted relationship, recording a status identifier indicating a state of the request, wherein the state of the request is indicative of the trusted relationship.

14. The non-transitory machine-readable storage medium of claim 13, wherein the processing device is to perform further operations comprising:

disabling messaging functionality between the first user account and the second user account via the collaboration platform prior to transmitting the first authentication code to the first user device, wherein the messaging functionality allows the first user account to communicate with the second user account using a messaging service via the collaboration platform; and establishing the messaging functionality between the first user account and the second user account via the collaboration platform after establishing the trusted relationship between the first user account and the second user account.

15. The non-transitory machine-readable storage medium of claim 13, wherein the processing device is perform further operations comprising:

receiving, by the collaboration platform, a second request from the second user device to establish the trusted relationship with the first user account of the collaboration platform;

responsive to the second request, transmitting a third authentication code to the second user device; and receiving a fourth authentication code from the first user device, wherein the authenticating of the first user and the second user to establish the trusted relationship is further in response to determining the fourth authentication code matches the third authentication code.

16. The non-transitory machine-readable storage medium of claim 13, wherein:

responsive to establishing the trusted relationship, the processing device is to perform further operations comprising providing an additional functionality to the first user account and the second user account via the collaboration platform; and the additional functionality comprising one or more of a messaging functionality that allows the first user account to communicate with the second user account using a messaging service in a virtual gaming environment, a sharing functionality that allows the first user account to share virtual items in the virtual gaming environment with the second user account, a following functionality that allows a first character of the first user account and a second character of the second user account to follow each other into a game hosted by the collaboration platform, an invitation functionality that allows the first user and the second user to invite each other to a private game hosted by the collaboration platform, or a group functionality that allows the first character of the first user account and the second character of the second user account to join a group hosted by the collaboration platform.

17. A method of establishing a trusted relationship, via a collaboration platform, between a first user account associated with a first user of the collaboration platform and a second user account associated with a second user of the collaboration platform, wherein the method comprises:
    receiving, by the collaboration platform and from a first user device associated with the first user, a request by the first user account to establish the trusted relationship with the second user account associated with the second user of the collaboration platform;
    responsive to the request by the first user account to establish the trusted relationship with the second user account, transmitting a first authentication code to the first user device;
    receiving a second authentication code from a second user device associated with the second user;
    responsive to determining that the second authentication code received from the second user device matches the first authentication code transmitted to the first user device, authenticating the second user to establish the trusted relationship between the first user account and the second user account of the collaboration platform; and
    responsive to authenticating the second user to establish the trusted relationship, recording a status identifier indicating a state of the request, wherein the state of the request is indicative of the trusted relationship.

18. The method of claim 17 further comprising:
    disabling messaging functionality between the first user account and the second user account via the collaboration platform prior to transmitting the first authentication code to the first user device, wherein the messaging functionality allows the first user account to communicate with the second user account using a messaging service via the collaboration platform; and
    establishing the messaging functionality between the first user account and the second user account via the collaboration platform after establishing the trusted relationship between the first user account and the second user account.

19. The method of claim 17 further comprising:
    receiving, by the collaboration platform, a second request from the second user device to establish the trusted relationship with the first user account of the collaboration platform;
    responsive to the second request, transmitting a third authentication code to the second user device; and
    receiving a fourth authentication code from the first user device, wherein the authenticating of the first user and the second user to establish the trusted relationship is further in response to determining the fourth authentication code matches the third authentication code.

20. The method of claim 17, wherein:
    responsive to establishing the trusted relationship, the method further comprises providing an additional functionality to the first user account and the second user account via the collaboration platform, and
    wherein the additional functionality comprises one or more of a messaging functionality that allows the first user account to communicate with the second user account using a messaging service in a virtual gaming environment, a sharing functionality that allows the first user account and the second user account to share virtual items in the virtual gaming environment, a following functionality that allows a first character of the first user account and a second character of the second user account to follow each other into a game hosted by the collaboration platform, an invitation functionality that allows the first user and the second user to invite each other to a private game hosted by the collaboration platform, or a group functionality that allows the first character of the first user account and the second character of the second user account to join a group hosted by the collaboration platform.

* * * * *